Aug. 6, 1929.  C. W. McKINLEY  1,723,054
OIL FILTER
Filed May 27, 1927
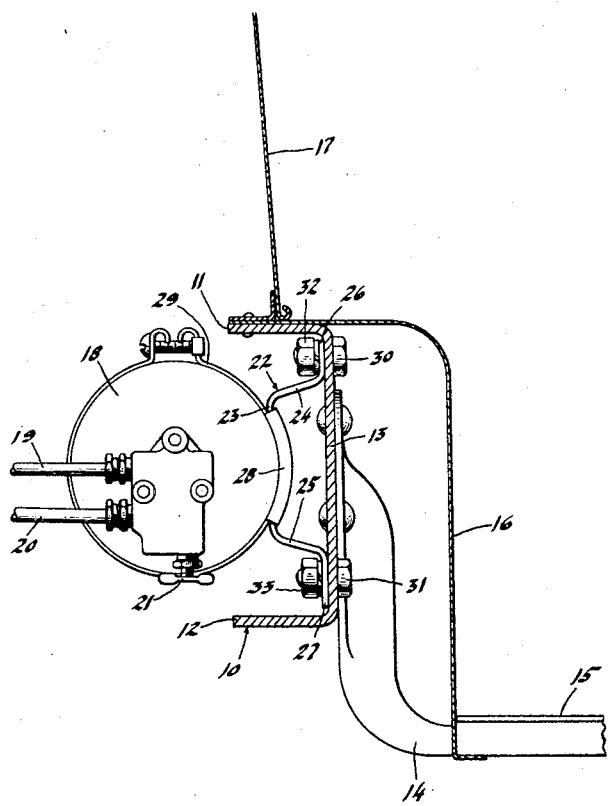
Inventor
Charles W. McKinley
By Blackmore, Spencer & Hill
Attorneys Patented Aug. 6, 1929.

1,723,054

UNITED STATES PATENT OFFICE.

CHARLES W. McKINLEY, OF FLINT, MICHIGAN, ASSIGNOR TO A C SPARK PLUG COMPANY, OF FLINT, MICHIGAN, A COMPANY OF MICHIGAN.

OIL FILTER.

Application filed May 27, 1927. Serial No. 194,666.

This invention relates to oil filters and has particular reference to the location of filters used on automotive vehicles.

It is the object of the present invention to form a very practical and inexpensive means for applying the filter container to the automotive vehicles. It is a further object of the invention to apply the filter in such a position that it is readily accessible and so that a considerable saving of tubing will result.

The filter can of the present invention is attached to the web of the usual channel-shaped chassis side bar by means of a U-shaped bracket. The U-bracket has feet on the legs of the U and the bracket is attached to the chassis by means of bolts passing through the feet and the web of the side bar. The filter can is attached to the base of the U and extends outwardly from the chassis bar between the flanges thereof.

The bracket is attached to the chassis at the forward part thereof and beneath the hood so as to render it readily accessible and to locate it near the crankcase of the engine.

The invention is disclosed in the accompanying drawing in which the figure represents a sectional view through the chassis side bar of an automotive vehicle showing the invention applied thereto.

Referring to the numbered parts on the drawing the chassis side bar of an automotive vehicle is indicated as a whole at 10 and this bar has the usual upper and lower flanges 11 and 12 connected by the web 13. The running board bracket is shown at 14 supporting the running board 15 while 16 denotes the usual apron applied between the chassis 10 and the running board 15.

The oil filter of the present invention is shown at 18 and has the usual inlet pipe 19 and outlet pipe 20 and also the by-pass test valve 21.

In order to attach the filter to the chassis side bar, I make use of a U-shaped bracket indicated as a whole at 22. This bracket has a base 23 and the legs 24 and 25, which have the right angularly bent feet 26 and 27 respectively. The base 23 is secured to the filter in any suitable way and is shown as fastened by means of a clamp 28 attached to a clamping ring 29 surrounding the filter can.

The U-shaped bracket 22 is secured to the chassis bar by means of the feet 26 and 27. These feet are provided with openings and are set against the inside of the web 13 of the side bar and bolts 30 and 31 are passed through the openings in the feet 26 and 27 and through corresponding openings in the web 13. The bolts have nuts 32 and 33 applied thereto to rigidly hold the bracket and filter to the chassis side bar.

From an inspection of the figure it will be noted that the filter 18 is held by the bracket 22 at a suitable distance from the web 13 and between the planes of the upper and lower flanges 11 and 12. The filter 18 is secured on the chassis side bar 10 under the hood 17 and adjacent the crankcase of the engine which will result in a material saving of tubing and render the filter more accessible.

I claim:

1. In combination with a vehicle, a channel shaped chassis side bar, a filter positioned between the planes of the flanges of the channel and extending into the channel, a U-shaped bracket having its base secured to the filter, feet on the legs of the bracket, and means passing through the feet and web of the chassis to secure the filter to the chassis.

2. In combination with the channel-shaped chassis side bar of a vehicle, a bracket having feet secured in vertical alinement to the web of the channel, and a filter secured to said bracket projecting into, and positioned between the planes of the channel flanges.

In testimony whereof I affix my signature.

CHARLES W. McKINLEY.

CERTIFICATE OF CORRECTION.

Patent No. 1,723,054.  Granted August 6, 1929, to

CHARLES W. McKINLEY.

It is hereby certified that error appears in the printed specification of the above numbered patent requiring correction as follows: Page 1, line 38, after "15." insert "The usual hood is shown at 17."; and that the said Letters Patent should be read with this correction therein that the same may conform to the record of the case in the Patent Office.

Signed and sealed this 10th day of September, A. D. 1929.

(Seal)

M. J. Moore,
Acting Commissioner of Patents.